No. 740,007. PATENTED SEPT. 29, 1903.
G. GRAMKOW.
ANIMAL POKE.
APPLICATION FILED JAN. 26, 1903.
NO MODEL.
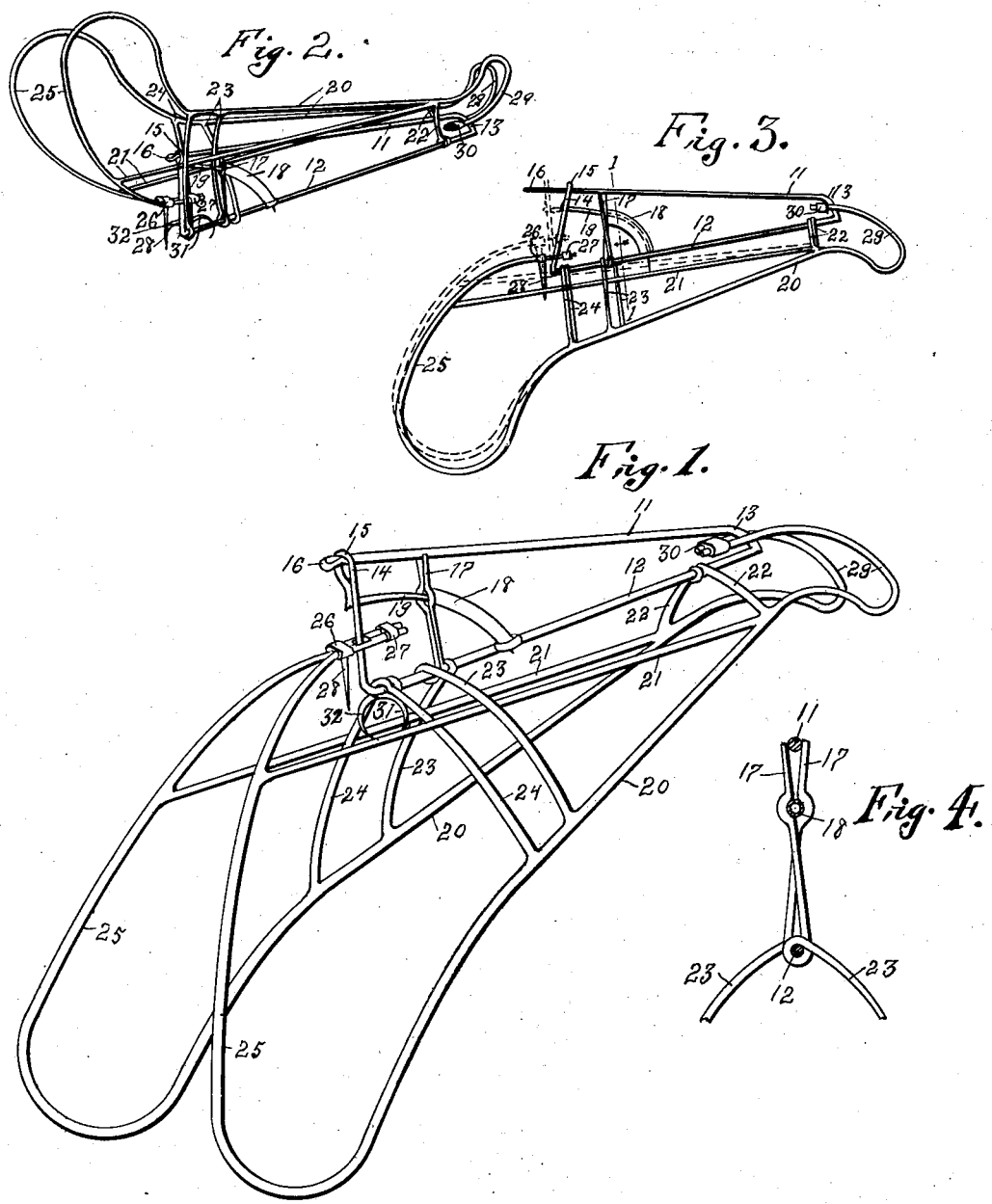

No. 740,007.

Patented September 29, 1903.

UNITED STATES PATENT OFFICE.

GUSTAV GRAMKOW, OF MESERVEY, IOWA.

ANIMAL-POKE.

SPECIFICATION forming part of Letters Patent No. 740,007, dated September 29, 1903.

Application filed January 26, 1903. Serial No. 140,609. (No model.)

*To all whom it may concern:*

Be it known that I, GUSTAV GRAMKOW, a citizen of the United States, residing at Meservey, in the county of Cerro Gordo and State of Iowa, have invented a certain new and useful Improvement in Animal-Pokes, of which the following is a specification.

The object of my invention are to provide an animal-poke of simple, durable, and inexpensive construction, which can be readily and easily attached to an animal and detached from it.

It is further my object to provide an animal-poke which will prevent an animal from getting between the wires of a wire fence and pushing the fence down by its weight. It is to be understood in this connection that my device is simply an improvement of my animal-poke for which I filed an application for Letters Patent August 15, 1902, Serial No. 119,822.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 is a perspective view of the complete device with the side portions in their lowered position, this position being the same as that in which the device is when upon the neck of the animal. Fig. 2 is a perspective view of the complete device with the side portions in their elevated position and in that position in which the poke is adjusted before the poke is put upon the neck of the animal. Fig. 3 is a side elevation of the complete device, showing the prong and probe for piercing the neck of the animal in the position which they will take when the wire has engaged them as the animal pushes its neck between the wires. This view shows in dotted lines the normal positions of these portions of the device, and Fig. 4 is a detail view showing a vertical section on line 1 1 of Fig. 3.

Referring to the accompanying drawings, I have provided a body portion for my poke. This body portion has the metal rod 11, forming its upper side, and the metal rod 12, forming its lower side, and the portion 13, which is a part of the same piece of wire as the portions 11 and 12, forms the rear end of the body portion. In the front end of the body portion and integral with the metal rod 12 and extending substantially at right angles to it is the upright 14. This upright 14 has a loop 15 at its upper portion designed to slip over the forward end of the rod 11. I have provided a loop 16 on the end of the rod 11 so arranged that the upright will be limited in its forward movement. Connecting the portions 11 and 12 between the portions 13 and 14 are the connecting-pieces 17. Mounted between the connecting-pieces 17 and the metal rod 12 is the curved tube 18. Mounted on the lower end of that portion of the upright 14 which forms the loop 15 is the wire probe 19, said probe being curved correspondingly with the tube 18, and it is so arranged as to enter the opening in the tube 18, so that as the upright is moved rearwardly toward the connecting-pieces 17 the probe 19 will be moved rearwardly and downwardly, so as to extend below the rod 12. To the rod 12 of the body portion of the poke I have mounted two side portions, each of said side portions having the metal bars 20 and 21 running longitudinally of the poke. The bars 20 and 21 are connected with each other and with the rod 12 of the body portion by the connecting-pieces 22, 23, 24, and 25, all of said portions being made integral with the bars 20. The connecting-piece 25 of the bars 20 is curved from the lower forward end of the bar 20 to its point of attachment to the upright 14 of the body portion of the poke. The upper portions of these connecting-pieces 25 are attached together by means of the bands 26 and 27, the band 26 being in front of the upright 14 and the band 27 being behind said upright. This is so arranged as to allow the upright sufficient play rearwardly and forwardly relative to the body portion of the device and also to allow the upper end of the connecting-pieces 25 to move upwardly and downwardly on said upright on account of one of the connecting-pieces 25 being on one side of the upright 14 and the other piece 25 being on the other side of the upright 14. Attached to the band 26 is the prong 28, extending downwardly therefrom a slight distance, so that when the upper end of the connecting-pieces 25 are at their upper limit of movement the lower end of the prong will be above the metal rod 12; but as the upper ends of these connecting-pieces 25 are moved downwardly the prong 28 will extend below the lower portion of the rod 12.

I provide the rearward extensions 29 to the bars 20, said extensions being curved, so as to fit readily over the neck of the animal. These are constructed in substantially the same shape as the curved portion at the forward end of the connecting-piece 20 and for the same purpose to more readily fit over the neck of the animal and hold the device more firmly in place. These extensions 29 are attached together at their upper forward ends by means of the band 30, which not only holds these extensions together, but also in position relative to the body portion. The connecting-pieces 22, 23, and 24 are rotatably mounted on the rod 12, so as to allow the sides to be swung upwardly into the position shown in Fig. 2.

Attached to the connecting-piece 24 is the substantially semicircular prong 31. Attached to the other portion 24 is a made prong 32, substantially semicircular in shape, so arranged that the points of the prong will engage each other when the sides are in the position shown in Fig. 1 of the drawings. These prongs are designed to be thrown out of engagement with each other and into the position shown in Fig. 2 when the device is removed from the neck of the animal. These prongs are designed to be thrown into engagement with each other and between the sides of the device when in the position shown in Fig. 1 and when upon the neck of the animal, it being the function of these prongs to hold the device in position firmly upon the animal's neck when in use.

In practical use the operator gathers the hide of the animal upon its neck between his fingers and draws this hide upwardly a short distance, and as the hide is loose on the neck of the animal upon which the poke is used this hide will be raised some distance above the flesh. The operator then takes the poke, which is in its open position, as shown in Fig. 2, places the prongs against the hide which he has drawn upwardly, and then presses the side portions downwardly toward the neck of the animal, and as this is done the prongs 31 and 32 will pierce the hide and effectually engage each other and form a circular opening between them, in which opening the hide is retained and the poke is firmly attached to the neck of the animal.

It will be seen in my improved device that when the poke is firmly attached to the neck of the animal and the animal pokes its head through the wire of the fence the wire which is above the neck of the animal will engage the connecting-pieces 25 and force them downwardly and cause the probe 28 to enter the animal's neck. This probe driving into the flesh of the animal will be usually sufficient to cause it to draw its head up from between the wires; but if it still persists in going forward the upper wire will slide forwardly and engage the upright 14 and cause the upper portion of it to be forced rearwardly and drive the prong 19 into the neck of the animal, and thus an effective poke will be provided.

If by any chance the upper wire slips over the portion 14, the animal will not be prevented from removing its neck from between the wires, as the curved extensions 29 are provided to allow the wire to freely slide over the poke when it is drawn from the rear end of the poke forwardly.

Having thus described my invention, what I claim, and desire to secure by Letters Patent of the United States therefor, is—

1. In a device of the class described, the combination of a body portion, having two sides, a rear end portion, an upright forming the forward end portion, a probe attached to said upright, so arranged that as the upper portion of the upright is moved rearwardly, the probe will be moved rearwardly and downwardly, side portions attached to said body portion, a prong on each side portion for holding the device in position on the neck of an animal, for the purposes stated.

2. In a device of the class described, the combination of a body portion, having two sides, a rear end portion, an upright forming the forward end portion, a probe attached to said upright, so arranged that as the upper portion of the upright is moved rearwardly, the probe will be moved rearwardly and downwardly, side portions attached to said body portion, a prong on each side portion for holding the device in position on the neck of the animal, for the purposes stated, springing forward ends to the side portions, a prong attached to said springing forward ends, capable of being moved downwardly when pressure is had upon the upper portion of the springing portions, for the purposes stated.

3. In a device of the class described, the combination of a body portion, having two sides, a rear end portion, an upright forming the forward end portion, a probe attached to said upright, so arranged that as the upper portion of the upright is moved rearwardly, the probe will be moved rearwardly and downwardly, side portions attached to said body portion, a prong on each side portion for holding the device in position on the neck of the animal, for the purposes stated, springing forward ends to the side portions, a prong attached to said springing forward ends, capable of being moved downwardly when pressure is had upon the upper portion of the springing portions, curved extensions forming the rear of said sides, for the purposes stated.

4. In a device of the class described, the combination of a body portion, sides rotatably mounted on said body portion, prongs attached to said sides for holding the device on the neck of the animal, springing forward ends for said sides, means for holding said springing forward ends in position relative to each other, a prong attached to said means, for the purposes stated.

5. In a device of the class described, the combination of a body portion having two sides, a rear end portion, an upright forming the forward end portion, a probe attached to said upright, so arranged that as the upper portion of the upright is moved rearwardly, the probe will be moved rearwardly and downwardly, means for attaching the poke to a neck of an animal, sides rotatably mounted on said body portion, springing forward ends for said sides, means for holding said springing forward ends in position relative to each other, a prong attached to said means, for the purposes stated.

GUSTAV GRAMKOW.

Witnesses:
J. E. HILL,
LOUIS FOELL.